Jan. 17, 1956  J. S. CARDILLO ET AL  2,731,569
HYDRAULIC TRANSMISSION AND CONTROL
Filed July 8, 1952  6 Sheets-Sheet 1

Inventors:—
Joseph S. Cardillo,
Melvin M. Hann,
Carl L. Sadler, Jr.,
Folke G. Lundgard,
By Schrader, Merriam,
Hofgren & Brady Attys.

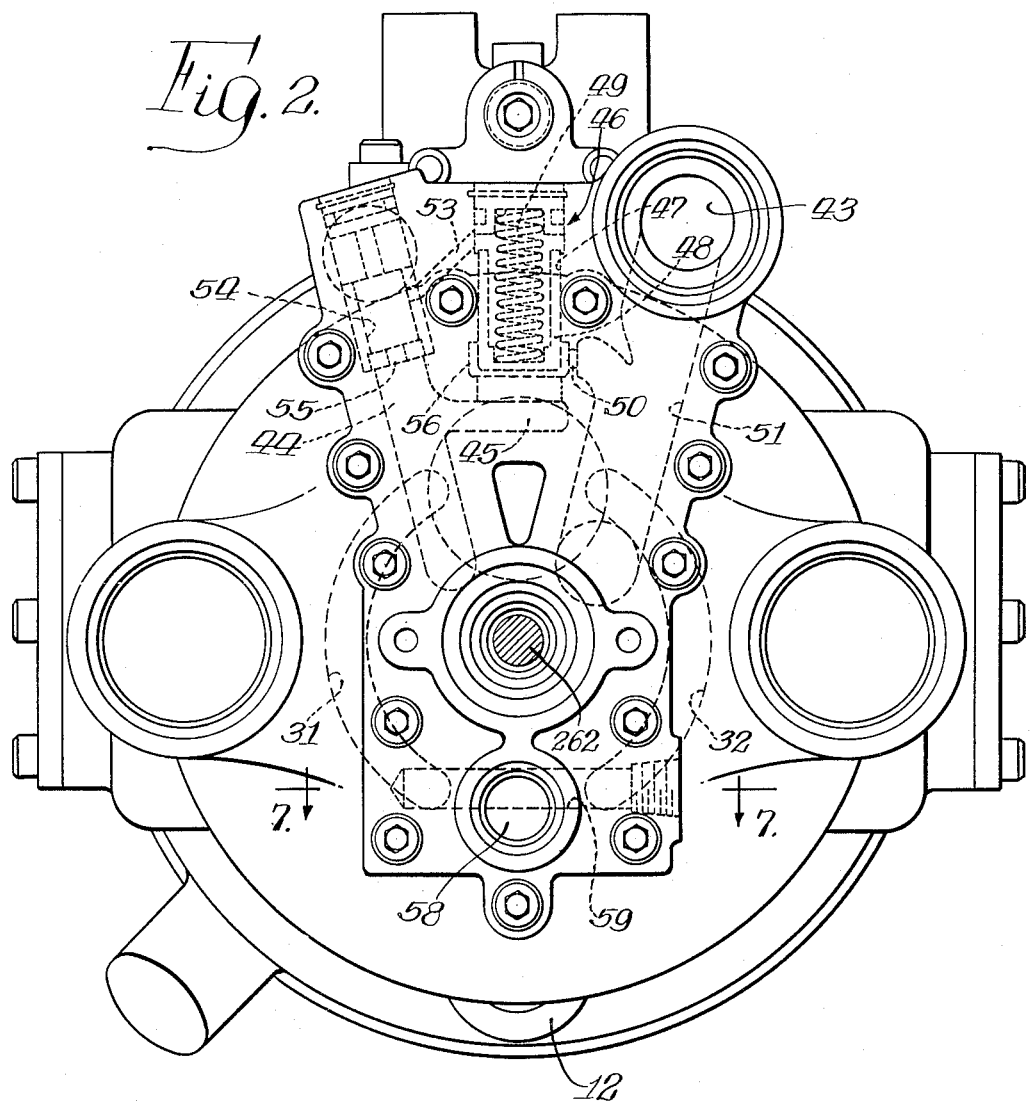

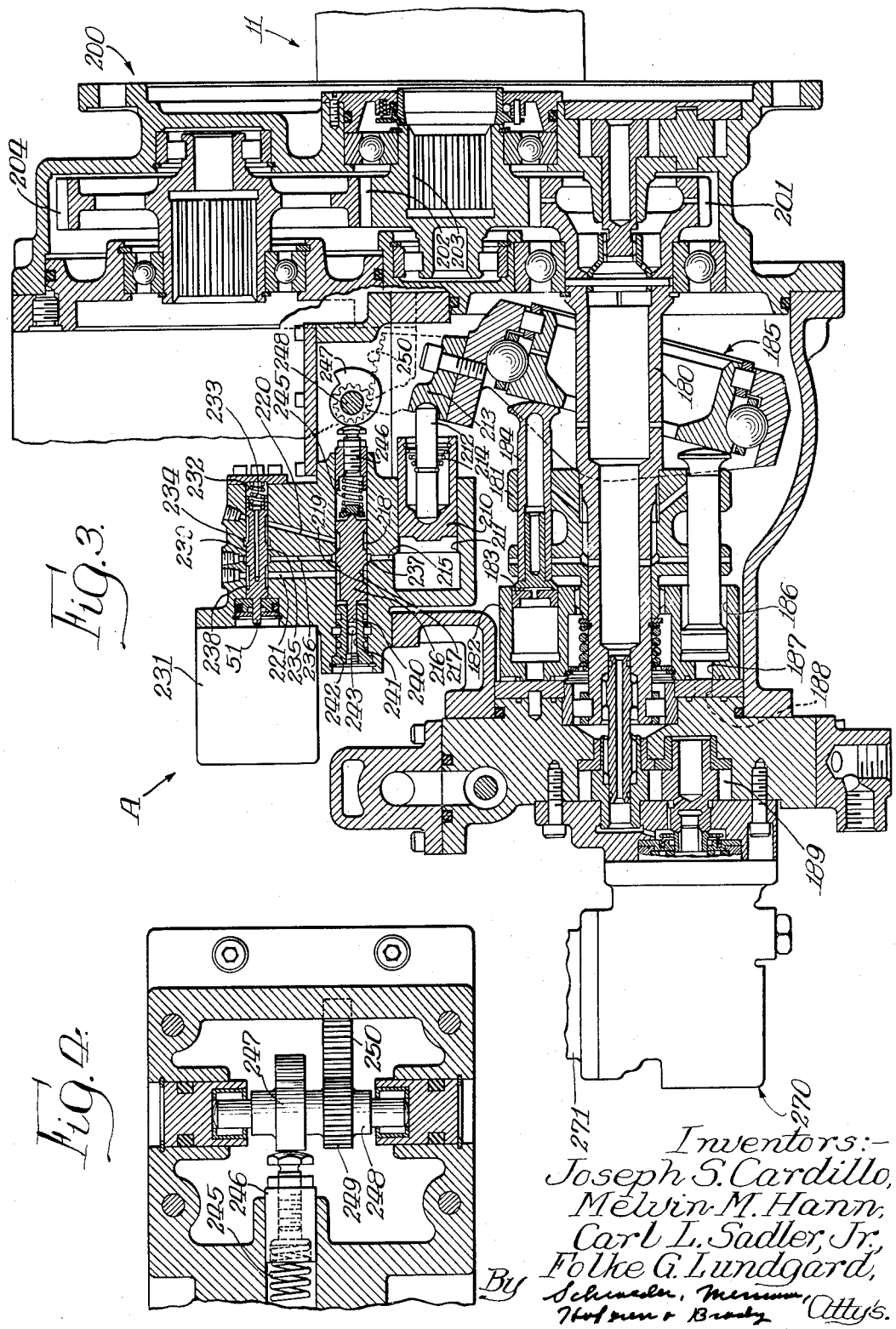

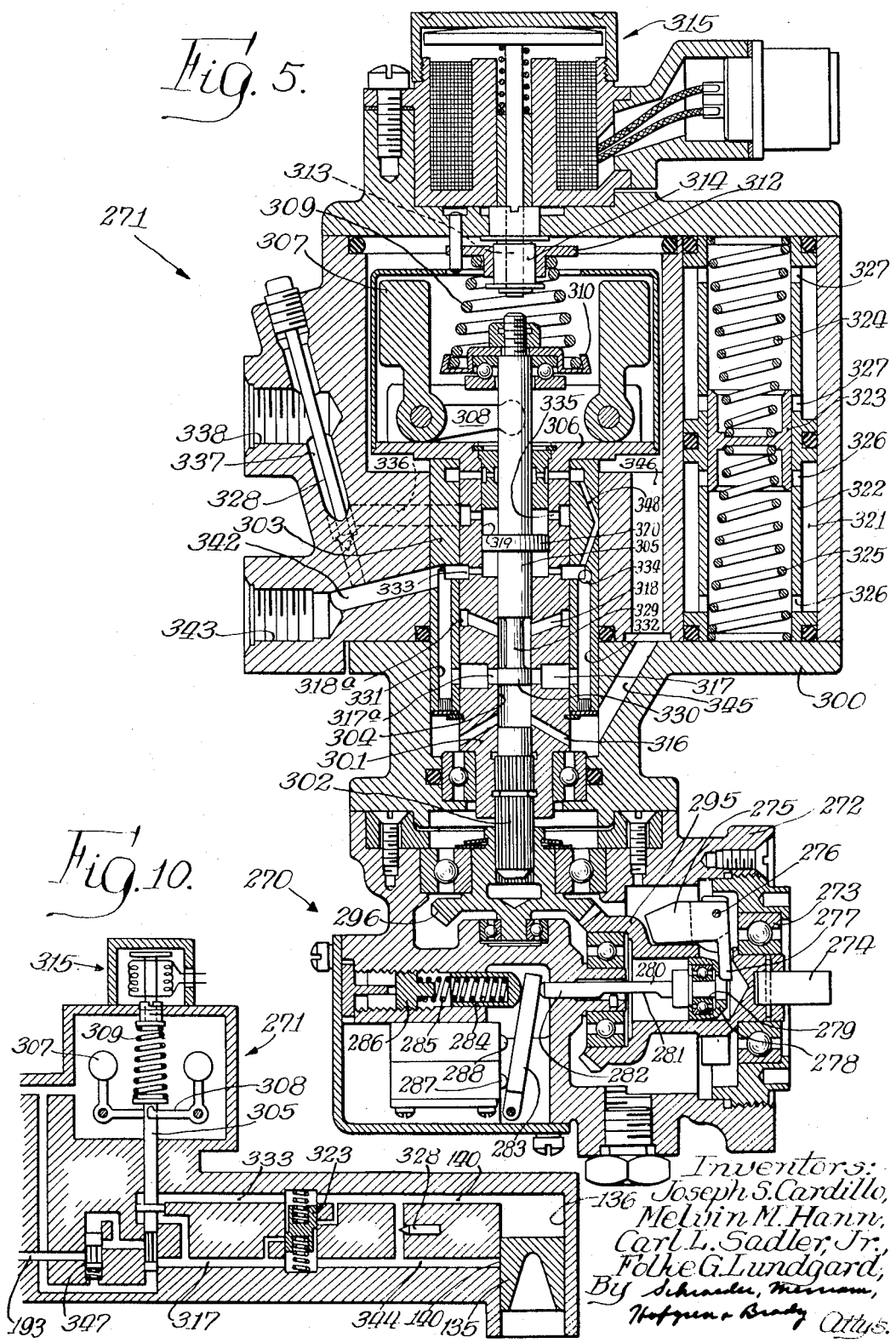

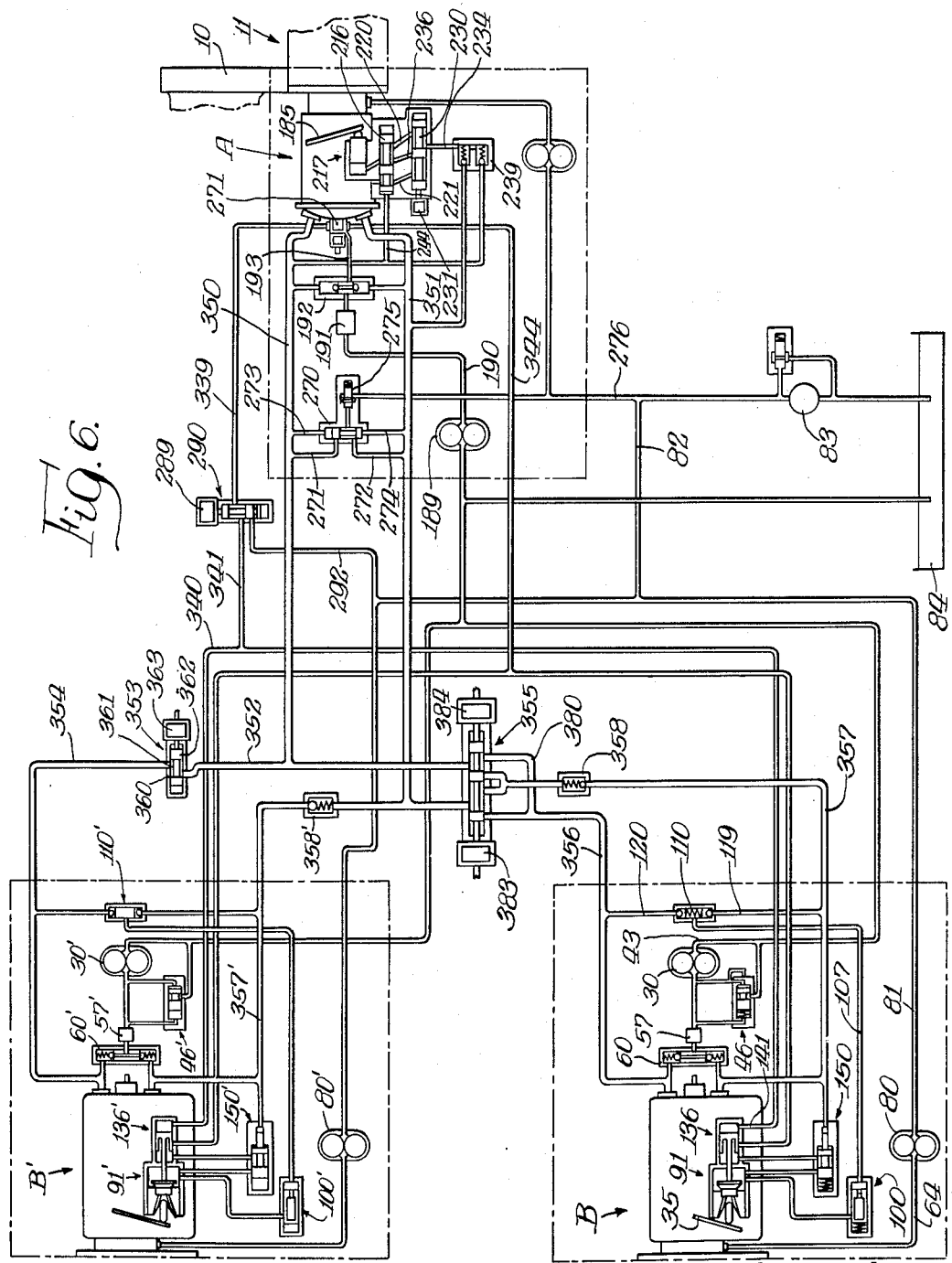

Jan. 17, 1956     J. S. CARDILLO ET AL     2,731,569
HYDRAULIC TRANSMISSION AND CONTROL
Filed July 8, 1952     6 Sheets-Sheet 6
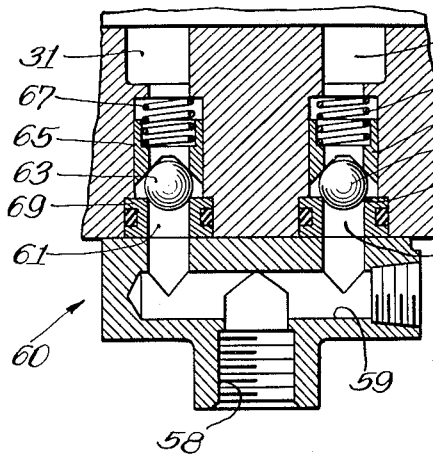
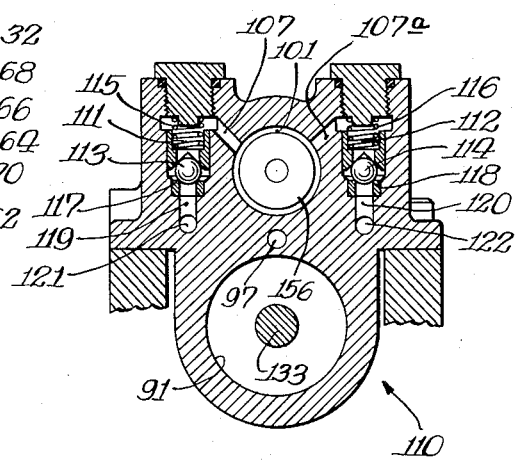
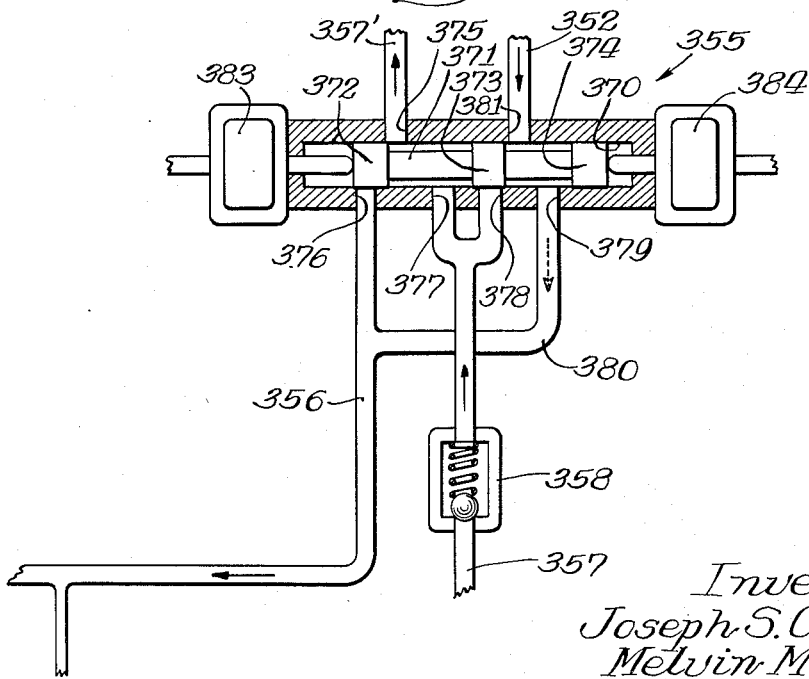
Inventors:—
Joseph S. Cardillo,
Melvin M. Hann,
Carl L. Sadler, Jr.,
Folke G. Lundgard,
By Schrader, Merriam,
Hofgren & Brady
Attys.

![United States Patent Office logo]

2,731,569
Patented Jan. 17, 1956

2,731,569

HYDRAULIC TRANSMISSION AND CONTROL

Joseph S. Cardillo, Melvin M. Hann, and Carl L. Sadler, Jr., Rockford, Ill., and Folke G. Lundgard, Del Mar, Calif., assignors to Sundstrand Machine Tool Co., a corporation of Illinois Application July 8, 1952, Serial No. 297,628

18 Claims. (Cl. 290—4)

This invention relates to a fluid transmission and control and more particularly to a hydraulic type transmission and control therefor for rotating either one of two elements from power supplied by the other element.

It is the general object of this invention to produce a new and improved hydraulic transmission and control.

It is a more specific object of this invention to produce a hydraulic transmission for connecting a driven element to a driving element for rotating the driven element at a constant predetermined speed regardless of variations in the speed of the driving element.

Another object of the invention is to provide a system for rotating a driven element at a constant predetermined speed from a remotely positioned driving element which may be rotated at variable speeds and in which the torque supplied by the driving element is transmitted through a hydraulic fluid medium to the driven element.

Another object of the invention is to provide a system of the type described in the preceding paragraph which may be used when the elements are operating in the reverse relationship, that is, one in which either of the elements may be the driving element with the other element being the driven element.

Yet another object of the invention is to produce an alternator generator drive including a hydraulic system connecting the generator with an engine and including controls for the system to achieve a constant speed of rotation of the generator regardless of the speed of the engine.

A further object is to produce a system of the type described in the preceding paragraph which may be used for starting the engine wherein electrical power is supplied to the generator and the torque of the rotating generator is transmitted by the hydraulic system to the engine to rotate the engine until it obtains self-sustaining speed.

A further object of the invention is to produce a device of the type described in the preceding paragraphs in which the generator may be driven from a plurality of engines wherein the generator may be used to start any one of said engines and in which the hydraulic system includes means, usable after one engine has been started, to utilize the power developed by a started engine for starting another engine.

A further object of the invention is to provide in the hydraulic systems described above a fluid displacement device connected to the engine or driving element and a fluid displacement device connected to the generator or driven element, with both of the devices being adapted to operate either as pumps or motors, depending upon whether the hydraulic system is used for starting the engine or is used after such startup for driving the generator.

Yet another object of the invention is to provide a device of the type described in the preceding paragraph with means for varying the displacement of the fluid displacement devices, together with control means therefor for fixing the displacement of the engine connected device when the engine is the driven element so as to apply full torque to the engine under starting conditions and for varying the displacement of the engine connected device when the engine is the driving element to drive the generator at a predetermined constant speed after startup.

Yet another object of the invention is to produce a control for the engine connected fluid displacement device mentioned in the previous paragraphs including a fluid actuated device for operating the displacement varying means and to control the pressure of such actuating fluid by means responsive to the speed of the driven element.

Another object of the invention is to provide a control for a variable displacement pump which includes a fluid actuated device in the form of a piston reciprocable in a cylinder and connected to the displacement varying means and to include in such system means for subjecting the piston to the high pressure of the hydraulic system and for regulating such pressure by means including valve means controlled by the speed of the driven element.

A further object of the invention is to produce a control means of the type described in the preceding paragraph in which said valve means is adapted to drain fluid from the cylinder whereby to cause movement of the displacement varying means and wherein said valve means is connected to a booster piston operating in a second cylinder supplied with fluid under pressure for moving the piston from a governor responsive to the speed of the driven element.

Yet another object of the invention is to produce a control device for a variable displacement pump to maintain the output of the pump at a predetermined level.

A further object of the invention is to produce a control of the type described in the preceding paragraph which will maintain the output of the pump at a predetermined horsepower, that is a control which is operable to correlate the pressure developed by the pump with the volume of fluid pumped to maintain the output horsepower of the pump below a predetermined limit.

A further object of the invention is to produce a control device of the type described in the preceding two paragraphs including a fluid actuated member for varying the displacement of the pump together with valve means for supplying actuating fluid to said member with the valve means being movable in one direction tending to decrease pump displacement with increasing output pressuse of the pump, movement of the valve in said direction being opposed by a resistance which is inversely proportional to the volume of fluid pumped.

Other and further objects of the invention will be readily apparent from the following description and drawings, in which:

Fig. 2 is a sectional view along line 2—2 of Fig. 1;

Fig. 3 is a sectional view through a hydraulic displacement device embodying other features of the invention;

Fig. 4 is a top plan view of the constant horsepower control incorporated in the pump shown in Fig. 3;

Fig. 5 is a sectional view of a governor forming a part of the control means of the hydraulic system;

Fig. 6 is a diagrammatic view of the pumps and hydraulic circuit associated therewith;

Fig. 7 is a detail view of the low pressure check valves used in the system;

Fig. 8 is a detail view of the high pressure check valves used in the system;

Fig. 9 is an enlarged view of the blocking valve shown in Fig. 6; and

Fig. 10 is a diagrammatic view of the governor circuit.

Figure 1:
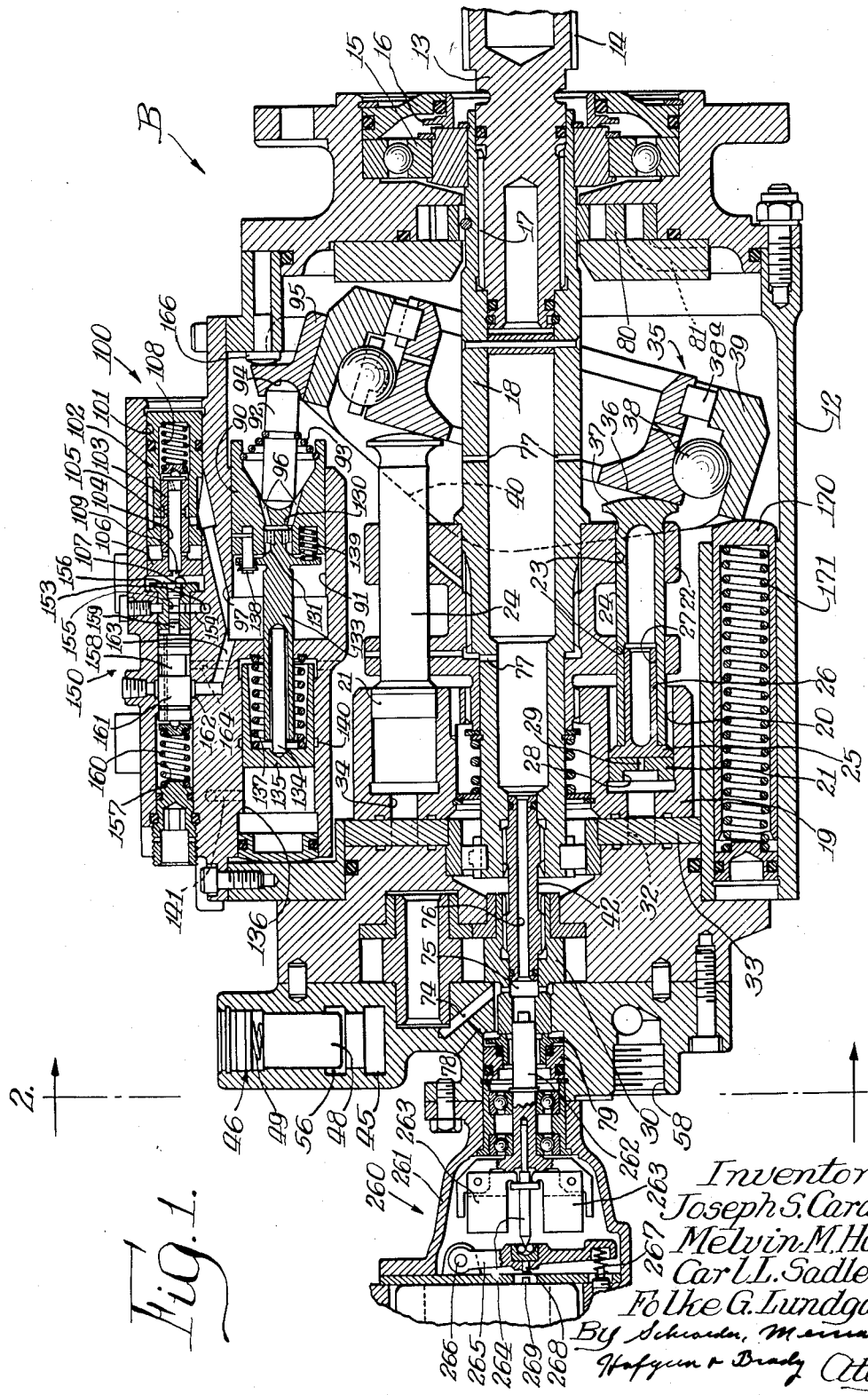
Fig. 1 is a sectional view of a hydraulic displacement device embodying certain features of the invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

While the inventions disclosed herein will suggest themselves to a wide variety of application to those skilled in the art, for the purposes of exemplary disclosure such inventions have been shown as incorporated in a hydraulic system for driving an aircraft alternator generator from the engines of the aircraft with the system being usable for starting the engines either from the generator or from another engine which has already been started.

A 400 cycle, 208/120 volt, three phase alternating current system is excellently suited for many aircraft applications. The most practical means of generating this electrical power at the desired frequency consists of driving an alternator at a constant speed using main aircraft engine power. Because of the fact that the speed of the engines in an aircraft may vary from idling sped at one extreme to takeoff speed at the other extreme, a simple driving connection between the engine and an alternator is obviously not feasible. One of the features of this invention is the provision of a hydraulic transmission for transmitting the main aircraft engine power to an alternator, with the transmission being provided with suitable controls to drive the alternator at a constant predetermined speed to produce the proper frequency.

It has been conventional practice to start aircraft engines by auxiliary engine mounted equipment, such as an electrical starter, which is actuated by an electrical power source located on the flight line or contained within the aircraft. The hydraulic transmission and system disclosed herein may be utilized for starting the aircraft engine by connecting an external source of electrical power to the alternator which then operates as a motor. The hydraulic system of this invention is suitable for transmitting the torque supplied by the alternator to the aircraft engine to rotate it until it reaches self-sustaining speed and may thereafter be used to start any one or more other engines of the aircraft from the torque supplied from the already started engine.

Referring now to Fig. 6, a wobbler-type fluid displacement device A is mounted upon a suitable pad 10 and connected to an alternator generator 11 for rotating the generator. A remotely positioned wobbler-type fluid displacement device B is connected by a suitable driving shaft to one of the engines (not shown) of the aircraft. A second engine mounted unit B' is similarly connected to a second engine (not shown). The two engine mounted units B and B' are adapted to be connected together and to the alternator mounted unit A for the purposes hereinbefore explained. Inasmuch as substantially all parts of the engine mounted units B and B' are similar such similar parts will be given similar reference numerals with those associated with the unit B' being primed.

*The engine mounted units*

Referring now to Fig. 1, the engine mounted unit B includes a housing 12 rotatably supporting a drive shaft 13 provided with a splined outer end 14 to be connected to the engine. The drive shaft 13 is supported in anti-friction bearings 15 adjacent the engine end thereof and a rotating seal 16 is provided to prevent leakage of oil along the shaft. The drive shaft 13 is connected by means of the spline arrangement 17 to a hollow rotatable inner drive shaft 18. The inner drive shaft 18 carries a cylinder block 19 provided with a plurality of cylinder bores 20 in which pistons 21 are reciprocable. The shaft 18 is also keyed to a rotor block 22 which is provided with a plurality of aligned openings 23 in which piston push rods 24 are reciprocable. The openings 23 in the rotor block are, of course, aligned with the cylinder bores 20 in the cylinder block but, inasmuch as the two blocks are separate units that act together, provision is made to allow for any misalignment that may result between the piston bores and the push rod bores. For this purpose a thrust plate 25 is provided with a tapered stem 26 which fits into a suitable tapered bore 27 formed in the push rod. The pistons 21 are preferably of Stellite and are not connected to the piston push rods but are constantly urged thereagainst by charge pressure in the manner hereinafter described. The pistons are provided with a recess 28 on the side opposite the side facing the piston push rods and with an orifice 29 which interconnects the two sides of the piston so that during operation of the device an oil film is constantly provided between the pistons and the thrust plates.

On the discharge stroke of the pistons the discharge pressure of the pump holds the pistons against the push rods while on the suction stroke of the pistons, charge pressure from a charge pump 30 provides the fluid pressure necessary to maintain contact between the pistons and the thrust plates on the ends of the push rods.

The pump is provided with a pair of kidneys 31 and 32 (Fig. 2) which are formed in a valve port plate 33 secured to the casing 12 and connection between the kidneys and the piston bores is through the worm holes 34 in the end of the cylinder block 19.

Reciprocation of the pistons with rotation of the cylinder block is achieved through a wobbler 35 having a face 36 contacting the convexly formed ends 37 of the piston push rods. The face 36 is rotatably carried by anti-friction bearings 38 and roller bearings 38a by a fixed portion 39 of the wobbler which is tiltably mounted on trunnions 40.

*The charge pump*

The charge pump 30 is a spur gear type oil pump and is used to supply the charge circuit with oil to make up for leakage and also insures that the cylinders will be fully charged at all times. The pump is mounted on a shaft extension 42 which is splined to the drive shaft 18 and to one of the gears of the charge pump. Flow to the inlet side of the charge pump is from a tank to an inlet connection 43 (Fig. 2) on the exterior of the casing and the discharge of the pump is through a discharge passage 44.

Inasmuch as the charge pump is driven by the drive shaft which in turn is driven by the engine, it is clear that the speed of rotation of the pump varies directly as the speed of rotation of the engine. The charge pump is designed to furnish sufficient pressure and volume of fluid to fulfill its functions at idling speeds of the engine, which functions demand oil at a rate which does not increase proportionally with the rate of rotation of the engine. Accordingly, the discharge passage 44 is connected by a branch line 45 to a charge flow regulating valve 46, the function of which is to bypass some of the fluid delivered by the charge pump as the speed of the engine increases so as to maintain a substantially constant flow of charge oil.

The charge flow regulating valve includes a cylinder 47 having a piston 48 reciprocable therein with the piston, when urged to the position shown in Fig. 2 by a compression spring 49, serving to close off a bypass passage 50 which is connected to a passage 51 which interconnects the inlet port 43 with the intake of the charge pump. The piston is subjected on one side to the pressure existing in the conduit 45 and on the other side to the pressure exerted by the spring 49 plus the pressure exerted by fluid within the cylinder 47. Fluid is conducted to the cylinder 47 by a passage 53 connected to the portion 54 of the charge pump outlet which is separated from the portion 44 by a pressure reducing orifice 55. The orifice 55 causes a pressure drop between the portions 44 and 54 of the charge pump outlet and the reduced pressure is applied on the inner side of the piston 48 through the passages just described. As the charge pump discharge flow increases with increased engine speed, the pressure differential on opposite sides of the piston 48 increases and when such differential exceeds the spring setting the piston will be moved upwardly establishing communication between an annular groove 56 surrounding the lower portion of the cylinder 47 and the bypass port 50 to permit a portion of the discharge of the pump to reenter the pump inlet. In effect, this action allows for required pumping through a metering action and inasmuch as the makeup requirements of the charge pump do not vary directly with speed (as does pump delivery) the excess of delivery over requirement is recirculated.

Flow from the discharge outlet of the charge pump is through an external filter 57 and thence reenters the end cap through port 58 and flows through passage 59 into a pair of low pressure check valves 60 (Fig. 7) which serve to direct the charge pressure into whichever kidney of the device B is functioning as the low pressure kidney.

The passage 58 connects with two check valve passages 61 and 62 each of which in turn connect to one or the other of kidneys 31 and 32. In each of the passages 61 and 62 there is provided a ball check, 63 and 64, carried by a spider, 65 and 66, which is urged by a spring, 67 and 68, into sealing engagement with a seat, 69 and 70. Charge pressure is sufficient to unseat either valve but insufficient to unseat a valve where the high pressure in the high pressure kidney is added to the spring pressure.

The discharge side of the charge pump is also connected by means of the passages 74, 75 and 76 (Fig. 1) to the interior of the drive shaft for lubrication purposes. Drilled holes, such as the holes 77, are provided at intervals along the drive shaft to allow oil supplied to the inside of the drive shaft through the passages to flow to points requiring lubrication. A passage 78 is also connected to passage 75 to permit lubrication of a shaft seal 79.

As the cylinder block and pistons rotate at high speed during normal operation, it is undesirable to permit an excess amount of oil to accumulate within the casing 12 due to the drag losses which would result. To maintain the interior of the casing relatively free from oil a scavenge pump 80 is provided. The scavenge pump is a gear-type pump secured to the drive shaft 18 and has its intake 81 connected into the bottom of the casing and its outlet connected to a passage 81 which is connected through a branch conduit 82 to a cooler 83 and thence to a tank 84 (Fig. 6).

*Displacement control system for engine mounted units*

As previously noted, the displacement of the B unit is determined by the position of the wobbler 35. Movement of the wobbler is achieved through a control piston 90 reciprocable in a cylinder 91 formed within the casing 12. A pin 92 is movably held against the right-hand end (as seen in Fig. 1) of the piston 90 by a spring 93 and is adapted to seat in a suitable recess 94 formed in a member 95 secured to the wobbler. Surrounding the seat of the pin 92 against the piston 90 is a plurality of orifices 96 to permit the escape of oil to the interior of the casing 12. Movement of the piston 90 is achieved through the introduction of fluid under pressure into the cylinder 91 through an inlet passage 97 together with valve means for draining fluid therefrom.

Introduction of fluid to the cylinder 91 is through a control flow regulating valve 100 mounted on the exterior of the casing. The control flow regulating valve is designed to receive fluid under pressure from the high pressure side of the system interconnecting the A and B units and to regulate the flow of fluid from that system as to introduce into the cylinder 91 fluid under a constant rate.

Referring to Figs. 1 and 6, the control flow regulating valve 100 is provided with a bore 101 in which there is fitted a sleeve 102. Slidable within the sleeve is a valving member 103 having a central chamber 104 and an annular groove 105. The valve member 103 is provided with a stem 106 adjacent one end thereof forming a piston slidable within the bore 101. The bore 101 is connected by means of the passage 107 to a pair of high pressure check valves 110 which serve to connect the passage 107 with either the inlet or the outlet kidney of the unit B depending upon which is carrying the high pressure, that is depending whether the unit B is acting as a motor or a pump. Thus the high pressure checks 110 select for delivery to the passage 107 the high pressure side of the hydraulic system.

As best seen in Fig. 8, the high pressure checks include cylinders 111 and 112 in which ball checks 113 and 114 are movable under the pressure of springs 115 and 116 against seats 117 and 118. Short passageways 119 and 120 connect with passages 121 and 122 each of which, in turn, is connected to a different one of the pump kidneys. The upper end of the cylinder 111 connects with passage 107 which opens into the bore 101 as does passage 107a connected to the upper end of cylinder 112. High system pressure unseats one of the ball checks and thereupon adds its pressure to that of the spring holding the other ball check closed to connect the bore 101 with the high pressure side of the system.

System pressure introduced into the bore 101 through the passages 107 or 107a acts upon the face of the piston 106 to move the valve member 103 against the opposition of a spring 108. The member 106 is provided in its center with an orifice 109 to permit fluid to flow to within the chamber 104. This small orifice, upon opening into the large area 104, causes a pressure drop and the resulting differential pressure between the chamber 104 and the area of the bore 101 adjacent the passage 107 acts against the spring to move the valve member 103. Movement of the valve member restricts the flow from the chamber 104 through the annular groove 105 and into the passage 97 which connects with the cylinder 91. An increase in system pressure serves to move the valve member to the right, thereby moving the annular groove 105 rightward to reduce the amount of fluid flowing into the passage 97. Thus the control flow regulating valve serves to direct fluid at a predetermined rate into the cylinder 91. In the particular installation illustrated, the control flow regulating valve 100 is so calibrated as to deliver approximately 0.3 gallon per minute flow into the cylinder 91. Fluid escapes from the cylinder around the seat 130 of a poppet valve 131 and through the previously mentioned orifices 96 for drainage to the case, and the fluid pressures exerted against the piston 90 are sufficient to overcome the stroke reducing moment of the wobbler 35 to tilt the wobbler against such moment toward maximum stroke position. Inasmuch as the flow regulating valve is connected to the high pressure side of the system, the presence of fluid delivered varies as the pressure in the system. As the control pressures required to effect increases in wobbler angle vary directly as the pressure in the system, the pressures available to move the wobbler are increased with the need therefor.

To control the position of the wobbler at various intermediate positions, means are provided for regulating the escape of fluid from the chamber 91 thereby to regulate the fluid pressure exerted against the piston 90 and thus to move the wobbler in a direction increasing displacement when the pressure is increased in the cylinder 91 or to decrease the pressure therein thereby permitting the stroke reducing moment of the wobbler to move the same toward zero stroke position. For this purpose the poppet valve 131 is formed on one end of a stem 133 loosely fitting around a pin 134 secured to a booster piston 135 reciprocable in a second cylinder 136 formed within the casing 12. A spring 137 serves constantly to urge the booster piston 135 to the left, that is in a direction moving the poppet valve 131 further away from its seat. The spring in the B' unit corresponding to the spring 137 should have the same characteristics as the spring 137 so that a single governor controlled pressure will produce substantially equal reactions in the control systems of both engine mounted units. Preferably, each control spring 137 is designed with a number of coils to give a linear rate of pressure over a specific range of deflection within the prescribed operating range. Thus a given change in governor controlled pressure results in a given movement of each piston 136 and 136'.

It is clear that movement of the piston 135 to the left to move the poppet valve farther from its seat permits fluid within the cylinder 91 rapidly to drain to case whereupon the piston 90 will move leftward until the seat carried thereby is moved sufficiently close to the poppet valve to reduce the area of the drain orifice to a point where the pressure in cylinder 91 is sufficient to hold the piston 90 stationary.

While, as previously noted, the stem 133 has but a loose fit on the pin 134, it is guided into proper seating position on the valve seat formed on the piston 90 by a detent pin 138 carried thereby. A spring 139 is seated in a suitable recess formed in the piston 90 and serves to unseat the poppet valve when it is not urged against the seat by the booster piston 135. An annular compensating groove 140 is formed in the cylinder 136 and contains the same pressure as the pressure within that cylinder, thus any tendency for leakage along the sides of the piston 135 are prevented by the fluid in the groove 140. Thus, the governor is enabled to provide a steady isochronic speed control.

Fluid is supplied to the left-hand end of the cylinder 136 through a passage 141 which is connected to the governor control hereinafter to be described.

Overpressure relief valve

In order to insure that the system pressure does not under any operating conditions exceed a predetermined amount, an overpressure relief valve 150 is provided. This valve operates as a safety measure and serves to tank fluid from within the cylinder 91 in the event that the discharge pressure in either of the engine mounted B units exceeds a certain value. System pressure, when the B units are operating as pumps, is conducted to the overpressure relief valve through a passage 153 which connects by means of passage 154 to the hollow interior 155 of a sleeve member 156 held within a cylinder 157 mounted on the case. Slidable in the cylinder is a valve member 158 having a stem 159 subjected to the pressure in the chamber 155 which operates to move the valve 158 to the left (as seen in Fig. 1) against the tension of a spring 160 bearing against the valve. The valve 158 is provided with a land 161 controlling a port 162 connected to a passage 163 opening into the cylinder 91. Movement of the valve 158 to the left under the influence of excessive system pressure establishes communication between the port 162 and an exhaust passage 164 which opens to the interior of the case. The establishment of such communication, of course, dumps fluid pressure from within the cylinder 91 whereupon the wobbler will move toward a zero stroke position.

When the wobbler is in maximum stroke position the member 95 rests against a wobbler stop pin 166 mounted on the case. If for any reason there should be a failure in the charge system, the pistons and push rods would move back and forth from the wobbler to the cylinder block in an uncontrolled manner and extensive damage might result. To return the wobbler to zero stroke position in the event of charge failure there is provided a piston 170 urged by a spring 171 into contact with the lower edge of the wobbler. The spring 171 has sufficient strength to return the wobbler to zero stroke position in the event of charge failure although insufficient to prevent movement of the wobbler to maximum stroke position under the force exerted by the control piston 90.

The alternator mounted unit

The alternator mounted unit A, as shown in Figs. 3 and 4, is in many respects similar to the motor mounted units. Thus it includes a drive shaft 180, a rotor block 181 and a cylinder block 182 carried thereby in which pistons 183 are reciprocable and bear against piston push rods 184 which in turn bear against a wobbler 185. Fluid is introduced into the cylinders 186 in which the pistons reciprocate through suitable worm holes 187 which connect to the pump kidneys 188. A charge pump 189 is connected for rotation by the drive shaft 180 and supplies fluid under pressure for charge and makeup purposes. To this end the charge pump 189 is provided with an outlet passage 190 which passes the oil through a filter 191 and thence through a pair of low pressure checks 192, which may be constructed similarly to the low pressure checks 60, and which sense the pressure between the inlet and outlet passages of the A unit to direct charge pressure into the low pressure kidney. Charge pressure is also directed through a line 193 into the governor for control of the wobblers in the B and B' units as hereinafter described.

The A unit is mounted upon a gear box assembly 200 with the drive shaft 180 being connected to a spur gear 201 rotatably mounted in the gear assembly and which in turn meshes with a second spur gear 202 carried by a shaft 203 to which the alternator generator 11 is secured for rotating the generator. Also meshing with the spur gear 202 is another spur gear 204 which may be connected to an oil pump for supplying oil under pressure for operating various hydraulic mechanisms on the aircraft such as the landing gear, the flaps and the like. If it be remembered that during normal operation the alternator 11 is driven at a constant speed by means of the hydraulic system disclosed herein it will be realized that the gear 204 is also driven at a constant speed. Because of this, a pump driven by the gear 204 can be designed to operate at a certain maximum efficiency rate and thus the size of the pump may be reduced over the size of the pump that would be necessary for one driven solely by the engine. In such cases it is clear that an engine driven pump must be able to furnish sufficient volume of hydraulic fluid under suitable pressure to operate such auxiliary equipment as wing flaps, landing gear and the like even when the engine is rotating at relatively slow revolutions per minute on approach procedures and thus must have a large capacity over that required of a pump driven at a constant speed.

Control of the wobbler 185 is through a piston and cylinder device including a piston 210 reciprocable in a cylinder 211 and loosely carrying a pin 212 contacting a member 213 secured to the wobbler and held in position by a spring 214. Fluid is introduced into the cylinder 211 through a passage 215 which is controlled by a valve member 216 slidable in a bore 217 formed in the casing for the A unit. The valve 216 is provided with a pair of annular grooves 218 and 219 and movement of the valve serves to connect the passage 215 with either pressure passage 220 or with a drain passage 221.

Under normal operating conditions when the A unit is serving as a motor, the valve 216 is positioned as to connect the passage 215 with the passage 220 to move the wobbler 185 to maximum stroke position, thus applying maximum torque to the alternator. When the A unit is used as a pump for starting the aircraft engines and electrical power is first applied to the alternator to operate it as a motor, it is desirable that the wobbler be in zero stroke position, and for this purpose there is provided a valve 230 connected to a suitable pre-start solenoid 231. The valve 230 is slidable in a bore 232 and is urged by a spring 233 to the position shown in Fig. 3.

System pressure is introduced into the annular groove 234 of the valve 230 and passes along the bore 232 along a reduced portion of the valve at the right-hand end thereof and into the passage 220. When the solenoid is energized, however, the valve 230 is moved rightward against the spring tension to a position where the land 235 thereon blocks the flow from the groove 234 and at the same time connects a passage 236 which connects to an annular groove 237 connected to the passage 215, to the drain passage 221 by means of a rather wide annular groove 238. By connecting the passage 215 to drain, the cylinder 211 is drained of pressure fluid and the natural moment of the wobbler moves it to zero stroke position. The annular groove 234 receives its pressure from a pair of high pressure checks (operating on the same principle as the checks 88) connected to the inlet and outlet passages for the A unit and serving to select the high pressure for introduction into the groove.

*Constant horsepower control*

In the starting cycle it is desirable to maintain a constant horsepower output of the alternator because of the limiting characteristics of alternator construction. To this end there is provided a system for shifting the valve 216 so as to correlate the volume of fluid moved by the A unit when operating as a pump with the pressure of the fluid moved thereby to place an upper limit on the output of the pump. To this end the valve 216 is provided with a stem 240 which is slidable within a cylinder 241 formed in a sleeve 242 in the left-hand end of the bore of the valve 216. Opening into the cylinder 241 is a port 243 which connects with a passage 244 (Fig. 6) connected to the outlet passage of the A unit. Thus, the stem 240 is subjected to the outlet pressure of the pump and tends to move the valve 216 to the right against the opposition of a spring 245. The spring 245 exerts its force to resist such movement of the valve 216 and means are provided for varying the opposition of the spring. To this end it is carried on a movable plunger 246 which extends outwardly of the bore of the valve 216 and bears against a cam 247 carried on a shaft 248 rotatably journaled on the case. The shaft 248 carries a spur gear 249 which meshes with a sector gear 250 mounted on the wobbler 185. The cam is so positioned on the shaft so as to force the plunger to its greatest extent inwardly, thus to compress the spring, when the wobbler is in zero stroke position. Upon initial rotation of the engine in starting, maximum pressure is developed in the system pressure lines and this pressure is exerted on the stem 240 and opposes the pressure of the spring 245 at the other end. If the pressure exceeds the spring setting, the valve 216 will be repositioned which tends to meter the flow from the passage 220 into the passage 215. As the system pressure decreases as the engine gains speed the valve 216 is moved by the spring 245 increasing the flow from the passage 220 into the passage 215 thus moving the piston 210 to the right and increasing the wobbler angle. This movement of the wobbler causes increased volume of flow proportionately to increase cranking speed and also decreases the tension of the spring 245. When the wobbler attains maximum angle the cam no longer influences spring setting. While the control just described is shown as providing a constant horsepower for the A unit, by simple redesign of the cam shape it can be effective for other purposes such as providing for a graduated change of horsepower or torque as speed is increased.

*Automatic starting cut-off*

As previously noted, an outside source of electrical current may be utilized to supply energy to the alternator to rotate the A unit as a pump and the fluid so pumped is directed to the B unit which then operates as a motor to rotate the engine associated therewith. When the engine reaches self-sustaining speed, means are provided for automatically cutting off the flow of current to the alternator. Referring to Fig. 1 the means for disconnecting the alternator from a ground source is in the form of a centrifugal switch 260. The switch includes a case 261 which rotatably supports a shaft 262 tang fitted at one end to the shaft 42 and carrying at its other end a pair of pivotally mounted weights 263. As the engine to which the B unit is connected reaches self-sustaining speed rotation of the drive shaft of the B unit and hence rotation of the shaft 262 is increased to swing the pivoted weights outwardly thereby to move a pin 264 which bears against the inner ends of the weights outwardly into contact with a switch arm 265 pivotally mounted to the housing at 266 and urged by a spring 267 into contact with the pin 264. As the pin 264 is moved outwardly a pair of contacts 268 and 269 carried by the switch arm and by the housing respectively are brought together, such contact serving to operate suitable mechanism to disconnect the alternator from the ground power source.

*Governor control for alternator drive*

When both the B and B′ units are operating as pumps and the A unit is operating as a motor, governor controlled means are provided for maintaining the speed of rotation of the alternator at a predetermined constant rate so as to provide the desired frequency of current. Means are also provided for preventing the alternator from being thrown into the electrical circuit of the aircraft until it has reached a certain minimum speed and other means are provided for cutting the alternator out of the circuit in the event its speed of rotation becomes excessive. Such overspeed and underspeed switches are contained within a right-angle drive housing 270 which supports a governor 271 and serves to connect the governor with the drive shaft 180 of the A unit.

Referring to Fig. 5, the right angle drive 270 includes a casing 272 in which are provided anti-friction bearings 273 rotatably supporting a shaft 274 which is secured to one of the gears of the gear pump 189 in the alternator mounted unit so as to be driven by the drive shaft 180 of the unit. A flyball 275 is pivoted at 276 and carries an arm 277 bearing against a collar 278 in which there is provided a ball bearing 279 which in turn carries a rod 280. The rod 280 is provided with a flattened portion 281 which extends through an opening suitably formed so as to prevent rotation of the rod. The free end 282 of the rod contacts a pivotally mounted switch arm 283. The ball bearing 279 is provided to permit rotation between the collar 278 and the non-rotating rod 280. Movement of the rod in response to outward movement of the rotating flyball is resisted by a plunger 284 urged against the opposite side of the switch arm 283 by a spring 285. The tension of the spring may be adjusted by a suitable adjusting nut 286.

A pair of contacts 287 and 288 are provided within the casing, the first contact 287 being the underspeed switch and the second 288 being the overspeed switch. During initial rotation of the alternator mounted unit, the switch arm 283 is out of contact with both contacts until the alternator reaches proper speed, at which time contact will be made between the switch arm 283 and the contact 287 to throw the alternator into the electrical circuit of the aircraft. In the event that failure of the control system should occur so that the alternator unit reaches an excessive speed, the centrifugal force of the flyweight 275 will cause contact to be made between the switch arm 283 and the overspeed contact 288. Such contact will actuate suitable electrical circuits connected to a solenoid 289 (Fig. 6) which controls a valve 290. Energization of the solenoid 289 will direct control pressure into the tank through a conduit 292 which connects into the branch conduit 82. Preferably some suitable form of latching mechanism is provided on the valve 290 to latch the valve in position when the solenoid 289 is energized so as to prevent the alternator from again being rotated at too rapid a speed until the failure of the control system has been corrected. Thus, normally the latching mechanism which may be associated with the valve 290 is so arranged as to be released only when the aircraft is on the ground.

The flyweight 275 and the collar 278 are mounted on a right angle bevel gear 295 which is rotatably supported within the casing 272 on the bearings shown. The gear 295 meshes with a second right angle gear 296 which serves to drive the governor 271.

The governor 271 is provided with a casing 300 in which there is rotatably supported a drive shaft 301 connected to the gear 296 by a serrated coupling 302. The drive shaft 301 is rotatable within a sleeve 303 provided within the casing 300 and the drive shaft has a cylindrical centrally formed bore 304 therein in which is reciprocably mounted a pilot valve 305. The upper portion of the drive shaft is provided with a flange 306 upon which flyweights 307 are pivotally mounted, each flyweight being provided with an arm 308 secured to the valve 305. Opposing the action of the flyweights is a compression spring 309, the lower end of which bears against a thrust washer 310 fixed to the stem of the pilot valve. The upper end of the spring is carried by a second thrust washer 312 fixed upon a plunger 313 which is adjustable by means of the nut 314. The plunger forms part of a solenoid 315 which, when energized, serves to move the valve 305 downwardly for the purposes described.

The drive shaft 301 is provided with a number of passages for controlling fluid including drain passages 316, outlet passages 317 and inlet passages 318. The bore 304 is enlarged near its upper end to form a cylinder 319 in which a transmitting piston 320 secured to the valve 305 is reciprocable.

Located at one side of the casing is a cylinder 321 in which there is provided a sleeve forming a buffer cylinder 322 in which a buffer piston 323 is reciprocable. The piston 323 is maintained in the central position shown by a pair of springs 324 and 325 and the cylinder is provided below its midpoint with a pair of ports 326 and above the midpoint with a second pair of ports 327.

The governor is for the previously noted purpose of maintaining constant the output speed of the alternator mounted unit and is so designed to enable the system to maintain a constant output speed independent of the load imposed on the system or of variations in the load. While various types of speed responsive controls may be used, there is shown herein a governor type control. The particular governor illustrated employs droop, which is the characteristic of decrease in output speed as load is picked up or an increase of output speed as the load is dropped off, to produce stability of operation during wobbler correction and then the droop is gradually removed as the system reacts to the wobbler correction and the output speed returns to the desired constant. Lack of droop would allow the wobbler to overcorrect and result in hunting. A feedback system is incorporated in the governor to act on the transmitting piston 320 to introduce the temporary droop action and an adjustable needle valve 328 is used to remove the droop by permitting oil pressure to leak across the buffer and transmitting pistons and may be adjusted so that the rate of droop removal is the same as the rate of response of wobbler correction.

Fluid under pressure from the makeup pump 189 is introduced through a suitable port (not shown) in the casing to a passage connected with the annular groove 318a which in turn connects with the passages 318. These passages open into the bore 304 at the location of a reduced portion 329 on the valve 305, which reduced portion terminates in a control land 330. In the event that a load should be imposed upon the alternator causing a drop in speed, the valve 305 will move downwardly within the bore 304 so that the land 330 uncovers the ports 317a connected to the passages 317. Fluid from the inlet passages 318 then may flow into passages 317 which connect with vertical passages 331 and 332 in the sleeve. The passage 331 connects with a port 333 which opens into the bottom of the cylinder 319 and thus fluid is admitted to act against the lower part of the transmitting piston 320. Such fluid pressure acts as a restoring force to urge the valve 305 upwardly partially closing ports 317a and introducing droop to the system by repositioning the flyweights 307 even though the system has not as yet corrected for the necessary speed increase to bring the system back to the desired constant operating speed. Fluid under pressure introduced into the vertical passage 332 is conducted therefrom by passage 334 to the lower portion of the cylinder 321 and is introduced into the interior of the sleeve 322 through the ports 326. Such pressure serves to move the buffer piston 323 upwardly forcing fluid above the piston through the ports 327 which connect by passages (not shown) to ports 335 which open into the cylinder 319 above the transmitting piston. This movement by the buffer piston is very rapid and the fluid moved thereby, after passing through the cylinder 319, enters passage 336 which intersects another passage 337 connected to an outlet port 338 of the casing. The port 338 is connected with a suitable passage 339 (Fig. 6) which in turn is connected with the valve 290 and thence to the booster cylinders 136 and 136' by means of the passage 340 connected to the valve 290 by the conduit 341 as shown.

The oil pressure admitted to the top of the transmitting piston 320 opposes the restoring force of the pressure on the bottom of the piston and tends to remove droop from the system. As the system responds to the wobbler change caused by the introduction of fluid under pressure into the booster cylinders 136 and 136', the speed of the alternator unit gradually returns to normal and causes the ball arms to return to their normal position which is preferably vertically arranged as shown. At the same time the upper spring 324 within the buffer cylinder tends to move the buffer piston downwardly to its original central position. The rate at which the buffer piston moves downwardly is determined by the setting of the needle valve 328 which is located in the passage 337, which passage at its lower end connects with another passage 342 formed in the casing, the latter passage opening at one end to the vertical passage 331 and provided with a port 343 at its other end which connects with a compensating line 344 in turn connected to each of the compensating grooves 140 formed in the booster cylinders 136. It will be remembered that the passage 336 is connected through the cylinder 319, passages 335 and ports 327 with the upper portion of the buffer cylinder while the passage 342 is connected through the passages 333, 334 and ports 326 with the lower portion of the buffer cylinder. Thus, if the needle valve opening is correct, the rate of return of the ball arms to vertical as the alternator returns to normal speed will be equaled by the rate of return of the buffer piston to normal. At the completion of the cycle the ball arms will be vertical, the pilot valve port 317a will be closed, the buffer piston will be in mid-position and the booster pistons 135 at the engine mounted units will be at a new position of increased wobbler angle supplying the necessary speed increase due to the increased load.

When the load is decreased and the alternator tends to be driven at greater than normal speed, the system operates in the following manner. As the speed of rotation of the alternator mounted unit increases, the flyweights move outwardly raising the pilot valve 305 connecting the portion of the cylinder 319 beneath the transmitting piston and the portion of the buffer cylinder beneath the buffer piston with atmospheric pressure through drain ports 316 and drain passages 345 and 346. The passage 346 opens at its upper end to the flyweight casing, which in turn is vented to atmospheric pressure by a line (not shown) to the system reservoir. Oil pressure on the top side of the transmitting system forces the pilot valve downwardly partially closing the control port. At the same time oil pressure on the top of the buffer piston forces the buffer piston down causing a pressure on the underside of the transmitting piston through the passages described that opposes the restoring force on the top side of the transmitting piston. As the buffer piston moves down, oil is drawn from the booster cylinders through port 338 to unseat the poppet valves connected thereto and thus to permit the wobblers in the engine mounted units to move in a direction decreasing the displacement of the pump. Such decreased displacement allows the alternator mounted unit to return to the desired constant speed. As the system responds to the change in wobbler angle the speed of the alternator unit returns to normal and thus the ball arms return to their normal vertical position. At the same time the lower spring returns the buffer piston to its mid-position at a rate determined by the opening in the needle valve.

When conditions of extreme load changes occur, there may be a surge in the system of such magnitude as to force the buffer piston either upwardly or downwardly so as to bring the end of the buffer piston either above the lowermost of the ports 327 or below the uppermost of the ports 326. Such movement of the buffer pistons allows the bypass of pressure directly through the buffer cylinder to provide for a greater rate of change than normally occurs within the compensating range of the buffer piston and cylinder alone, that is, when a change of such magnitude occurs, oil may flow directly to the booster pistons through the buffer cylinder, which oil may exceed in volume that which would be moved by movement of the buffer piston alone.

If desired, a pressure regulating valve 347 (Fig. 10) may be provided between the passage 193 from the charge pump and the pilot valve bore. The valve 347 regulates the flow across an orifice as determined by the position of the valve stem which is positioned by the balance of force of the incoming pressure as against a spring force. If the supply pressure is from a constant pressure source this valve may be omitted and the oil ported directly to the groove 318a. Passages 348 may be provided which connect with the passages 333 and serve as a pressure balance against any leakage which may occur along the pilot valve stem.

*Interconnecting hydraulic system*

Referring now to Fig. 6, it will be understood that those portions of the circuit enclosed within the dotted lines are incorporated into the alternator and engine mounted units, while those not so enclosed constitute the interconnecting hydraulic system. The outlet of the A unit is connected to an outlet passage 350 while the inlet is connected to an inlet passage 351. The outlet passage 350 is connected to a branch conduit 352 which leads to a blocking valve 353 controlling a passage 354 leading to the inlet of the B' unit. The branch conduit 352 also connects to a second blocking valve 355 controlling a passage 356 leading to the inlet of the B unit and also controlling the outlets of the B and B' units through the passages 357 and 357'. Located in the outlet passages 357 and 357' are check valves 358 and 358' for permitting only unidirectional flow through such passages. The inlet passage 351 for the A unit is connected to the portion of the conduit 357' between the check valve 358' and the valve 355.

The blocking valve 353 includes a bore 360 having a spaced valve 361 movable therein with the spool valve having a land 362 controlling communication between the passages 352 and 354. A solenoid 363 is connected to the spool valve and when energized serves to move the spool valve from the position shown in which free communication is provided between the passages 352 and 354 to a position wherein the land 362 blocks communication between those passages to cut out the B' unit during startup.

The blocking valve 355 (see Fig. 9) includes a bore 370 having a spool valve 371 movable therein and carrying three lands 372, 373 and 374. The lands control a number of ports formed in the bore, namely a port 375 connected to the passage 357', port 376 connected to the passage 356, a pair of ports 377 and 378 each connected to the outlet line 357, a port 379 connected to a branch conduit 380 which is in communication with the inlet line 356, and a port 381 connected to the branch conduit 352. The spool valve 371 is adapted to be moved by solenoids 383 and 384 to establish communication between the B unit and the A unit or between the B and B' units.

*Cycle of operation*

The function of the hydraulic system can perhaps best be understood by a description of the cycle of operation which occurs from startup to normal operating conditions. On the startup, a suitable source of electrical current is connected to the alternator 11 to rotate the alternator and hence the drive shaft of the A unit. Solenoid 231 is energized so as to drop the pressure within the cylinder 211 to permit the wobbler 185 of the A unit to move to zero stroke position, and this solenoid is held energized until the A unit reaches 6,000 R. P. M. During this time all other solenoids are deenergized. When the A unit reaches 6,000 R. P. M. solenoid 231 is deenergized. This permits fluid in passage 220 to be directed into the passage 215 to move the wobbler in a direction increasing the displacement of the unit with movement of the wobbler in that direction being restricted by the constant horsepower cam arrangement. Solenoid 315 secured to the governor 271 is then energized to move the governor controlled valve 305 to a position calling for maximum stroke. This directs fluid under pressure from the governor into passage 339 and thence into branched conduit 340 to move the wobblers in the B unit to maximum stroke position. Solenoid 363 on the blocking valve 353 is energized to move the valve into position blocking off the passage 354 from the passage 352 so that the entire output from the pump is directed into the B unit. The oil pumped by the A unit flows through ports 381 and 379 of the blocking valve 355 and into the passages 380 and 356 and into the inlet of the B unit to drive the unit as a motor and thus causing the engine connected thereto to rotate. When the engine attains a self-sustaining speed, the starting cycle centrifugal switch 260 closes its contacts to disconnect the ground power source from the alternator. When the engine connected to the B unit reaches a speed of approximately 4,800 R. P. M. the delivery of the B unit may be used to start the B' unit.

To start the B' unit from the B unit, solenoid 231 on the A unit is energized to put the wobbler in that unit into zero stroke position for rejecting flow so that all the B unit output can be used to start the engine connected to B'. Solenoid 384 of the blocking valve 355 is energized and solenoid 363 is deenergized. Energization of solenoid 384 moves the valve 371 to the left to a position permitting flow between ports 378 and 381 and between ports 375 and 376. Thus, the outlet 357 of the B unit is connected through the blocking valve 355 to the passage 352 and through the blocking valve 353 to the inlet passage 354 for the B' unit, while the outlet passage 357' of the B' unit is connected through the blocking valve 355 to the inlet passage 356 of the B unit. Fluid introduced into the B' unit causes it to rotate the engine connected thereto until it has reached self-sustaining speed. When this occurs all of the solenoids may be deenergized whereupon the output of both engine mounted units is directed into the alternator mounted unit for driving the alternator. The position of the wobblers in the engine mounted unit is, from then on, determined by the governor through the means previously described.

Should it be desired initially to start the B' unit rather than the B unit, the described steps are followed except that solenoid 363 is not energized and solenoid 383 is energized to permit flow from the A unit to be delivered to the inlet of the B' unit while moving the valve 371 to a position blocking ports 375 and 381 to isolate the B unit. After the engine connected to the B' unit has reached self-sustaining speed, the B unit may be started by energizing solenoid 231 to drop the wobbler in the A unit to zero stroke, solenoid 384 is then energized to permit flow between ports 375 and 376 and between ports 378 and 381 to deliver the output from the B' unit to the B unit.

After both engines have been started, all solenoids are deenergized and the A unit operates as a constant displacement motor and the B units as variable displacement pumps connected in parallel to the motor. Control of the displacement of each pump is maintained by the governor and its associated control system as to produce a constant speed of rotation of the alternator regardless of the speed of the engines.

We claim:

1. A hydraulic system for driving a driven element at a constant rotative speed from a driving element rotated at variable speeds comprising a variable displacement pump connected to the driving element, a hydraulic motor connected to the driven element, passages interconnecting the inlet and outlet of the pump with the outlet and inlet respectively of the motor, means for varying the displacement of the pump, a control piston reciprocable in a cylinder for operating the displacement varying means, a control flow regulator valve connected to the outlet passage of the pump and operating to deliver fluid at a substantially constant rate and pressure to said cylinder to urge the control piston toward movement increasing pump displacement, means constantly biasing the control piston toward movement to decrease pump displacement, a booster piston reciprocable in a second cylinder and adapted to actuate the control piston, and means for supplying fluid under pressure to the booster cylinder to move the booster piston whereby to cause movement of the control piston in a direction increasing pump displacement, said last named means including a source of fluid under pressure connected to the booster cylinder, a valve device controlling said connection and a governor responsive to the speed of the driven element for operating the valve device.

2. A hydraulic system for driving a driven element at a constant rotative speed from a driving element rotated at variable speeds comprising a variable displacement wobbler-type pump connected to the driving element; a wobbler-type hydraulic motor connected to the driven element; passages interconnecting the inlet and outlet of the pump with the outlet and inlet respectively of the motor; means for shifting the wobbler to vary the displacement of the pump including a control piston reciprocable in a cylinder and connected to the wobbler; a control flow regulator valve connected to the outlet passage of the pump and operating to deliver fluid at a substantially constant rate to said cylinder to bias the control piston toward movement shifting the wobbler in a direction to increase pump displacement; means constantly biasing the control piston toward movement to decrease pump displacement; a booster piston reciprocable in a second cylinder and adapted to control the fluid pressure in the control cylinder; means for supplying fluid under pressure to the booster cylinder to move the booster piston whereby to cause the control piston to move in a direction increasing pump displacement, said last named means including a source of fluid under pressure connected to the booster cylinder, a valve device controlling said connection, and a governor responsive to the speed of the driven element for operating the valve device; and an overpressure relief valve connected to the outlet of the pump and operating in response to the build-up of pressure beyond a predetermined amount in the outlet passage of the pump to dump the pressure applied to said control piston whereby to permit the spring to move the control member in a direction reducing pump displacement.

3. A hydraulic system for driving a driven element at a constant rotative speed from a driving element rotated at variable speeds comprising a variable displacement pump connected to the driving element, a hydraulic motor connected to the driven element, passages interconnecting the inlet and outlet of the pump with the outlet and inlet respectively of the motor, means for varying the displacement of the pump, a control piston reciprocable in a cylinder for operating the displacement varying means, a control flow regulator valve connected to the outlet passage of the pump and operating to deliver fluid at a substantially constant rate to said cylinder to urge the control piston toward movement increasing pump displacement, means constantly biasing the control piston toward movement to decrease pump displacement, valve means for draining fluid from said cylinder, a fluid pressure operated device controlling said valve means and means for supplying fluid under pressure to said fluid pressure operated device including a source of fluid under pressure connected thereto and means responsive to the speed of the driven element for controlling the pressure delivered by said source.

4. A hydraulic system for driving a driven element at a constant rotative speed from a driving element rotated at variable speeds comprising a variable displacement pump connected to the driving element, a hydraulic motor connected to the driven element, passages interconnecting the inlet and outlet of the pump with the outlet and inlet respectively of the motor, means for varying the displacement of the pump, a control piston reciprocable in a cylinder for operating the displacement varying means, a control flow regulator valve connected to the outlet passage of the pump and operating to deliver fluid at a substantially constant rate to said cylinder to urge the control piston toward movement increasing pump displacement, means constantly biasing the control piston toward movement to decrease pump displacement, valve means for draining fluid from said cylinder, a booster piston for operating the valve means and reciprocable in a second cylinder, and means for supplying fluid under pressure to the booster cylinder to move the valve means toward closed position including a source of fluid under pressure connected to the booster cylinder, a valve device controlling said connection and a governor responsive to the speed of the driven element for operating the valve device.

5. A hydraulic system for driving a driven element at a constant rotative speed from a driving element rotated at variable speeds comprising a variable displacement pump connected to the driving element, a hydraulic motor connected to the driven element, passages interconnecting the inlet and outlet of the pump with the outlet and inlet respectively of the motor, means for varying the displacement of the pump, a movable control member, a source of fluid under pressure, means connecting said source to said member including means for maintaining said pressure at a predetermined constant value, whereby constantly to urge said member toward movement in one direction to operate the displacement varying means, means biasing the control member toward movement in the other direction, valve means further controlling the fluid pressure applied to the control member, a fluid pressure operated device controlling said valve means, and means for supplying fluid under pressure to said fluid pressure operated device including a second source of fluid under pressure connected thereto and means responsive to the speed of the driven element for controlling the pressure delivered by said second source.

6. Control means for a multiple piston wobbler-type pump comprising a hydraulic piston and cylinder device connected to the wobbler, means for delivering to the cylinder hydraulic fluid to maintain therein fluid pressure sufficient to hold the wobbler in stroke imparting position, a vaiving port extending through said piston, a second hydraulic piston and cylinder device having a cylinder axially aligned with the first cylinder, a valve secured to the piston of said second device and controlling said valving port, means for introducing fluid under pressure into the cylinder of the second device to move the piston to a position wherein the valve closes said port whereby the fluid pressure in the first cylinder is increased to move the wobbler in a direction increasing pump displacement, means for draining fluid pressure from the cylinder of said second device to cause movement of the valve axially of the first cylinder thereby unseating the valve to drain the cylinder of the first device whereby to permit the moment of the wobbler to move the same toward zero stroke position thereby moving the piston of the first device toward said valve to seat the same on the valving port, and valving means for controlling the fluid pressure in the cylinder of said second device.

7. A hydraulic system for applying torque to either of two rotatable elements from power supplied to the other element comprising a wobbler-type fluid displacement device operatively connected to one element and a wobbler-type fluid displacement device operatively connected to the other element with each fluid displacement device being adapted to operate as a pump when its connected element is the powered element and to operate as a motor when its connected element is the driven element, passage means for connecting the outlet and inlet of the device operating as a pump with the inlet and outlet respectively of the device operating as a motor, and means for controlling the wobblers of said devices and operating automatically to fix the displacement of the device acting as a motor and to vary the displacement of the device acting as a pump.

8. A hydraulic system for drivingly connecting together an engine and a generator to drive the generator from the engine or to start the engine from power supplied by the generator comprising a wobbler-type fluid displacement device connected to the engine and a wobbler-type fluid displacement device connected to the generator with each fluid displacement device being adapted to operate as a pump and as a motor, passage means for connecting the inlet and outlet of the device operating as a pump with the outlet and inlet respectively of the device acting as a motor, means for shifting the wobbler of the fluid displacement device connected to the generator toward maximum stroke position when electrical power is supplied to the generator to drive the generator connected device to pump fluid under pressure through said passage means, means for shifting the wobbler of the fluid displacement device connected to the engine into maximum stroke position for rotation by said fluid to rotate the engine, and means for maintaining the wobbler of the generator connected device in maximum stroke position and for varying the position of the wobbler of the engine connected device upon engine start up whereby to control the flow of fluid pumped by the engine connected device to the generator connected device to drive the generator at a predetermined speed.

9. A hydraulic system for drivingly connecting together an engine and a generator to drive the generator from the engine or to start the engine from power supplied by the generator comprising a wobbler-type fluid displacement device connected to the engine and a wobbler-type fluid displacement device connected to the generator with each fluid displacement device being adapted to operate as a pump and as a motor, passage means for connecting the inlet and outlet of the device operating as a pump with the outlet and inlet respectively of the device acting as a motor, means for shifting the wobbler of the fluid displacement device connected to the generator into stroke imparting position when electrical power is supplied to the generator to drive said connected device to pump fluid under pressure through said passage means, means including a fluid operated device for shifting the wobbler of the fluid displacement device connected to the engine into maximum stroke position for rotation by said fluid to rotate the engine, high pressure selective means connected to the passage means and operable to connect said fluid operated device to the passage carrying high pressure from the outlet of the generator connected fluid displacement device, means for maintaining the wobbler of the generator connected fluid device in maximum stroke position after engine start up, and means for varying the position of the wobbler of the engine connected fluid displacement device including said fluid operated device connected, after such start up, by said high pressure selective means to the passage carrying high pressure from the outlet of the engine connected fluid displacement device.

10. A hydraulic system for drivingly connecting together an engine and a generator to drive the generator from the engine or to start the engine from power supplied by the generator comprising a wobbler-type fluid displacement device connected to the engine and a wobbler-type fluid displacement device connected to the generator with each fluid displacement device being adapted to operate as a pump and as a motor, passage means for connecting the inlet and outlet of the device operating as a pump with the outlet and inlet respectively of the device acting as a motor, means for shifting the wobbler of the fluid displacement device connected to the generator into stroke imparting position when electrical power is supplied to the generator to drive said connected device to pump fluid under pressure through said passage means, means including a piston and cylinder device connected to the wobbler in the fluid displacement device connected to the engine for shifting said wobbler into maximum stroke position for rotation by said fluid to rotate the engine, high pressure selective means connected to the passage means and operable to connect said cylinder to the passage carrying high pressure from the outlet of the generator connected fluid displacement device, means for maintaining the wobbler of the generator connected fluid device in maximum stroke position after engine start up, means for varying the position of the wobbler of the engine connected fluid displacement device including said piston and cylinder device wherein the cylinder is connected after such start up by said high pressure selective means to the passage carrying high pressure from the outlet of the engine connected fluid displacement device, valve means for draining fluid from said cylinder to vary the displacement of the engine connected device and a member movable in response to the speed of the generator for controlling said valve means.

11. A hydraulic system for drivingly connecting together an engine and a generator to drive the generator from the engine or to start the engine from power supplied by the generator comprising a wobbler-type fluid displacement device connected to the engine and a wobbler-type fluid displacement device connected to the generator with each fluid displacement device being adapted to operate as a pump and as a motor, passage means for connecting the inlet and outlet of the device operating as a pump with the outlet and inlet respectively of the device acting as a motor, means for shifting the wobbler of the fluid displacement device connected to the generator into stroke imparting position when electrical power is supplied to the generator to drive said connected device to pump fluid under pressure through said passage means, means including a piston and cylinder device connected to the wobbler in the fluid displacement device connected to the engine for shifting said wobbler into maximum stroke position for rotation by said fluid to rotate the engine, high pressure selective means connected to the passage means and operable to connect said cylinder to the passage carrying high pressure from the outlet of the generator connected fluid displacement device, a centrifugal switch connected to the engine connected fluid displacement device for cutting off said electrical power after engine start up, means for maintaining the wobbler of the generator connected fluid device in maximum stroke position after engine start up, means for varying the position of the wobbler of the engine connected fluid displacement device including said piston and cylinder device wherein the cylinder is connected after such start up by said high pressure selective means to the passage carrying high pressure from the outlet of the engine connected fluid displacement device, valve means for draining fluid from said cylinder to vary the displacement of the engine connected device and a member movable in response to the speed of the generator for controlling said valve means.

12. A hydraulic system for drivingly connecting together a plurality of engines and a generator to drive the generator from the engines or to start an engine from power supplied by the generator or another engine comprising a wobbler-type fluid displacement device for each engine and for the generator with each device being connected to its associated engine or generator and with each device being adapted to operate as a pump and as a motor, first passage means connecting the inlet and outlet of the generator connected device to the outlet and inlet respectively of one of the engine connected devices, second passage means connecting the inlet and outlet of the generator connected device to the outlet and inlet respectively of the other engine connected device, third passage means connecting the inlet and outlet of the first mentioned engine connected device to the outlet and inlet respectively of the other engine connected device, valve means controlling said passage means, and means for operating the valve means to connect the generator connected device only to one of said engine connected devices when electrical power is supplied to the generator to pump fluid under pressure to the last mentioned device to rotate the engine connected thereto and for operating the valve means to connect the last mentioned engine connected device, after start up of its associated engine, only to the other engine connected device to rotate the engine connected thereto, and for operating the valve means to connect both engine connected devices to the generator connected device to drive the generator after start up of both engines.

13. A hydraulic system for drivingly connecting together a plurality of engines and a generator to drive the generator from the engines or to start an engine from power supplied by the generator or another engine comprising a wobbler-type fluid displacement device for each engine and for the generator with each device being connected to its associated engine or generator and with each device being adapted to operate as a pump and as a motor, first passage means connecting the inlet and outlet of the generator connected device to the outlet and inlet respectively of one of the engine connected devices, second passage means connecting the inlet and outlet of the generator connected device to the outlet and inlet respectively of the other engine connected device, third passage means connecting the inlet and outlet of the first mentioned engine connected device to the outlet and inlet respectively of the other engine connected device, valve means controlling said passage means, and means for operating the valve means to connect the generator connected device only to one of said engine connected devices when electrical power is supplied to the generator, means for shifting the wobbler of the generator connected device into stroke imparting position to pump fluid under pressure through said first passage means, means for shifting the wobbler of the last mentioned engine connected device to maximum stroke position to rotate the engine connected thereto by said fluid under pressure, means for operating the valve means to connect the last mentioned engine connected device, after start up of its associated engine, only to the other engine connected device, means for shifting the wobbler of said other engine connected device to maximum stroke position to rotate the engine associated therewith, means for operating the valve means to connect both engine connected devices to the generator connected device to drive the generator after start up of both engines, and means for varying the position of the wobblers of both engine connected devices, after start up of both engines, whereby to control the flow of fluid pumped by the engine connected devices to drive the generator at a predetermined speed.

14. A hydraulic system for drivingly connecting together a plurality of engines and a generator to drive the generator from the engines or to start an engine from power supplied by the generator or another engine comprising a wobbler-type fluid displacement device for each engine and for the generator with each device being connected to its associated engine or generator and with each device being adapted to operate as a pump and as a motor, first passage means connecting the inlet and outlet of the generator connected device to the outlet and inlet respectively of one of the engine connected devices, second passage means connecting the inlet and outlet of the generator connected device to the outlet and inlet respectively of the other engine connected device, third passage means connecting the inlet and outlet of the first mentioned engine connected device to the outlet and inlet respectively of the other engine connected device, valve means controlling said passage means, means for operating the valve means to connect the generator connected device only to one of said engine connected devices when electrical power is supplied to the generator, means for shifting the wobbler of the generator connected device into stroke imparting position to pump fluid under pressure through said first passage means, means for shifting the wobbler of the last mentioned engine connected device to maximum stroke position to rotate the engine connected thereto by said fluid under pressure, means for operating the valve means to connect the last mentioned engine connected device, after start up of its associated engine, only to the other engine connected device, means for shifting the wobbler of said other engine connected device to maximum stroke position to rotate the engine connected thereto, means for operating the valve means to connect both engine connected devices to the generator connected device to drive the generator after start up of both engines, and means for varying the position of the wobblers of both engine connected devices, after start up of both engines, said last named means including a fluid operated device connected to each wobbler, high pressure selective means connected to the passage means and operable to connect each of said fluid operated devices to the passage carrying high pressure from the outlets of the engine connected fluid displacement devices, valve means controlling the pressure exerted upon said fluid operated devices by said high pressure, and means responsive to the speed of the generator connected device for controlling the valve means.

15. A hydraulic circuit comprising a variable displacement fluid pump and a fluid motor to be driven thereby, a high pressure circuit including passages connecting the outlet and inlet of the pump with the inlet and outlet respectively of the motor, a charge pump having its inlet connected to a source of hydraulic fluid, a low pressure circuit including a passageway connecting the outlet of the charge pump with the passage connected to the inlet of the pump to supply makeup fluid to the high pressure circuit, a pair of fluid pressure operated devices for varying the displacement of the pump, means connecting the first of said devices to the high pressure circuit passage connected to the outlet of the pump, flow control means interposed in said connecting means for delivering to said first device fluid at a substantially constant rate, other means connecting the second device to the low pressure circuit, valve means controlling the last mentioned connecting means, and means responsive to the speed of the fluid motor for controlling said valve means.

16. Apparatus for maintaining the output of a wobbler-type pump at a predetermined level comprising a cylinder having a piston reciprocable therein, means connecting the wobbler to the piston for movement therewith to control the displacement of the pump, means biasing the wobbler toward movement decreasing pump displacement, a source of control fluid connected to the cylinder, a valve controlling the control fluid including a member subjected to the outlet pressure of the pump and movable in response to increasing outlet pressure to move the valve in a direction to divert control fluid from said cylinder to permit said biasing means to move the wobbler in a direction decreasing pump displacement, a compression spring having one end bearing against the member and having its other end bearing against a movable plunger whereby the spring opposes movement of the member in such direction, a cam contacting the plunger and rotatable to move the plunger to vary the compression of the spring, a shaft carrying the cam, a gear carried by the shaft, and a sector gear mounted on the wobbler and meshing with the other gear whereby to rotate the cam in a direction increasing the compression of the spring with movement of the wobbler in a direction decreasing pump displacement.

17. A hydraulic system comprising a pair of fluid displacement devices each adapted to operate as a fluid pump and as a fluid motor, a high pressure circuit including passages connecting the outlet and inlet respectively of the other device, a charge pump having its inlet connected to a supply of hydraulic fluid, a low pressure circuit including a pair of passageways connecting the outlet of the charge pump with both of said passages, low pressure check valves in said passageways for limiting flow therethrough to the passage carrying low pressure to the inlet of the device acting as a pump to supply makeup fluid to the high pressure circuit, and means for varying the displacement of one of the devices including a pair of fluid pressure operated devices, means connecting the first of said fluid pressure operated devices to the passage carrying high pressure, a control flow regulating valve interposed in said connecting means for delivering to said first fluid pressure operated device fluid at a substantially constant rate, means connecting the second fluid pressure operated device to the low pressure circuit, valve means controlling the last named connecting means and means responsive to the speed of operation of the other fluid displacement device for controlling said valve means.

18. Apparatus for maintaining the output of a wobbler-type pump at a predetermined level comprising a cylinder having a piston reciprocable therein, means connecting the wobbler to the piston for movement therewith to control the displacement of the pump, means biasing the wobbler toward movement decreasing pump displacement, a source of control fluid connected to the cylinder, a valve controlling the control fluid including a member subjected to the outlet pressure of the pump and movable in response to increasing outlet pressure to move the valve in a direction to divert control fluid from said cylinder to permit said biasing means to move the wobbler in a direction decreasing pump displacement, a compression spring having one end bearing against the member and having its other end bearing against a movable member whereby the spring opposes movement of the first mentioned member in such direction, pressure applying means contacting the movable member and operable to move said movable member whereby to vary the compression of said compression spring and means operated by the wobbler for operating said pressure applying means whereby to move the movable member in a direction increasing the compression of the spring with movement of the wobbler in a direction decreasing pump displacement.

References Cited in the file of this patent

UNITED STATES PATENTS

| | | |
|---|---|---|
| 1,418,952 | Martin | June 6, 1922 |
| 2,056,896 | Douglas | Oct. 6, 1936 |
| 2,069,230 | Ferris | Feb. 2, 1937 |
| 2,161,439 | Thoma | June 6, 1939 |
| 2,177,098 | Doe et al. | Oct. 24, 1939 |
| 2,291,011 | Vickers | July 28, 1942 |
| 2,299,234 | Snader et al. | Oct. 20, 1942 |
| 2,389,473 | Vickers | Nov. 20, 1945 |
| 2,407,013 | Ifield | Sept. 3, 1946 |
| 2,500,655 | Bevins et al. | Mar. 14, 1950 |